United States Patent
Ruegg

[11] 4,030,034
[45] June 14, 1977

[54] OVERDRIVE PROTECTION CIRCUIT FOR POWER LINE CARRIER SYSTEMS AND THE LIKE

[75] Inventor: Eugen H. Ruegg, Lynchburg, Va.
[73] Assignee: General Electric Company, Lynchburg, Va.
[22] Filed: Jan. 30, 1976
[21] Appl. No.: 653,716
[52] U.S. Cl. .................. 325/319; 325/62; 325/362; 325/404; 325/410
[51] Int. Cl.² .......................................... H04B 1/16
[58] Field of Search ............ 325/62, 319, 362, 400, 325/404, 405, 407–411; 330/133, 134; 179/15 BP; 333/15, 16

[56] References Cited
UNITED STATES PATENTS

| | | | |
|---|---|---|---|
| 2,757,239 | 7/1956 | Patton | 179/15 BP |
| 3,449,525 | 6/1969 | Berry et al. | 179/15 BP |
| 3,470,480 | 9/1969 | Smart et al. | 325/400 |

Primary Examiner—Robert L. Griffin
Assistant Examiner—Jin F. Ng
Attorney, Agent, or Firm—James J. Williams

[57] ABSTRACT

In previous power line carrier systems, the gain of a broadband frequency amplifier was controlled by a feedback loop that utilized the magnitude of a pilot frequency signal. When the amplifier was turned on or when the gain control loop was switched into the circuit, large magnitude signals in the broadband of frequencies tended to overdrive the amplifier. This condition caused the pilot frequency signal to be suppressed so that the gain of the amplifier was kept too high. As a result, the broadband signals were limited and distorted. The pilot frequency signal stayed suppressed so that the carrier system caused faulty operation. The invention provides an added feedback loop that controls the gain of the broadband frequency amplifier as a function of the broadband of frequency signals until the pilot frequency signal can control the gain. After the pilot frequency signal begins to control, the broadband frequency loop is rendered inoperative.

5 Claims, 2 Drawing Figures

OVERDRIVE PROTECTION CIRCUIT FOR POWER LINE CARRIER SYSTEMS AND THE LIKE

BACKGROUND OF THE INVENTION

My invention relates to an overdrive protection circuit, and particularly to an overdrive protection circuit that limits the gain of a broadband frequency amplifier in a power line carrier system.

In previous power line carrier systems, the gain of a broadband frequency amplifier was controlled by a feedback loop using the magnitude of a pilot frequency signal. When the broadband frequency amplifier was turned on, or when the feedback loop was switched into the circuit, large magnitude signals in the broadband of frequencies tended to overdrive the amplifier. As a result, the pilot frequency signal was suppressed, and the gain of the amplifier was kept too high so that the signals were distorted, or so that those operations in the power line carrier system that depended on the pilot frequency signal were faulty.

Accordingly, a primary object of my invention is to provide a new and improved overdrive protection circuit for power line carrier systems.

Another object of my invention is to provide a new and improved circuit for use with power line carrier systems to maintain the gain of a broadband frequency amplifier at the desired level, even though the pilot frequency signal may be lost or suppressed.

Another general object of my invention is to provide a new and improved circuit that prevents overdrive and thus improves the reliability and quality of a power line carrier system.

SUMMARY OF THE INVENTION

Briefly, these and other objects are achieved in accordance with my invention by a broadband frequency gain control loop in addition to the existing pilot frequency signal gain control loop,. If the pilot frequency signal is lost or suppressed, the added broadband gain control loop keeps the gain of the amplifier at the proper level until the pilot frequency signal is restored. Once the pilot frequency signal is restored, its gain control loop removes control from the broadband frequency gain control loop.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF A PREFERRED EMBODIMENT

Figure 1:
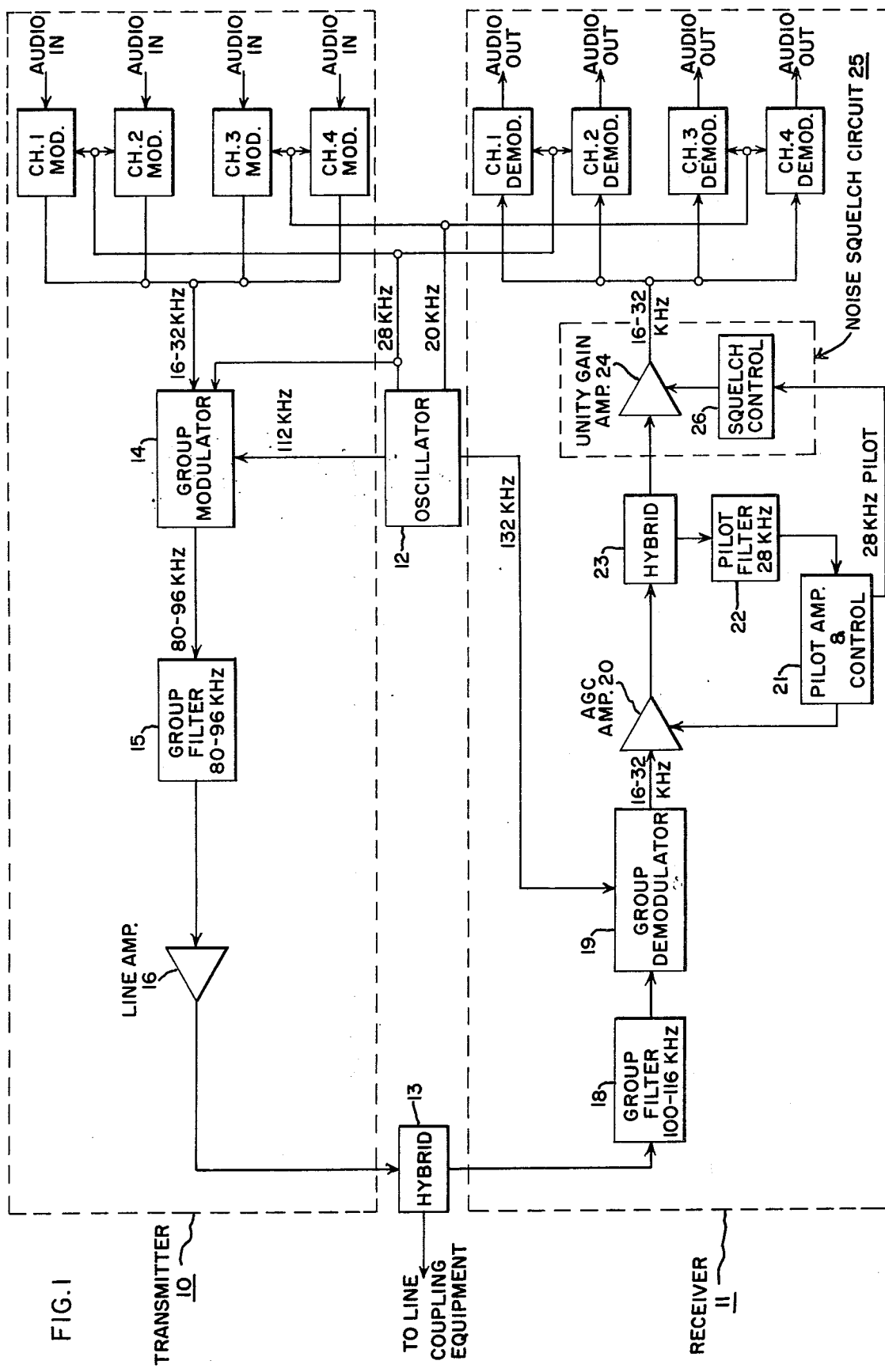
FIG. 1 shows an example of a typical prior art power line carrier system with which my invention can be used.

FIG. 1 shows, by way of example, part of a prior art power line carrier system that I have assumed provides four voice frequency or audio frequency information channels. In this example, the system comprises a transmitter 10 and a receiver 11 (which are shown enclosed in respective dashed lines); a common oscillator 12; and a common hybrid 13 which couples the transmitter 10 and the receiver 11 through line coupling equipment to the transmission line. The line coupling equipment is not shown, but typically includes a high voltage capacitor having a low impedance to the carrier frequencies, and a high impedance to the 60 cycle power frequency. I have also assumed that the system transmits the four information channels in a carrier frequency band between 80 and 96 KHz, and receives the four information channels in a carrier frequency band between 100 and 116 KHz. In order to provide these frequencies, the oscillator 12 supplies channel modulating and demodulating frequencies of 20 and 28 KHz to both the transmitter 10 and the receiver 11; a group modulating frequency of 112 KHz to the transmitter 10; and a group demodulating frequency of 132 KHz to the receiver 11. In the transmitter 10, the four audio or voice frequency channel signals (up to 4 KHz) are applied to respective channel modulators. These modulators convert the audio frequency signals to single sideband, amplitude modulated signals between 16 and 32 KHz. This band of frequencies is applied to a group modulator 14, along with a pilot frequency of 28 KHz. This pilot frequency is used at a distant receiver to provide various functions. The group modulator 14 is also supplied with a 112 KHz signal to convert the band of frequencies between 16 and 32 KHz to the band of frequencies between 80 and 96 KHz. This latter band of frequencies is applied to a group filter 15 which rejects frequencies outside this band. The band of frequencies is applied to a line amplifier 16 which provides a suitable power level output for application to the hybrid 13. These frequencies are transmitted to a distant receiver over the line coupling equipment and the transmission lines.

In the receiver 11, single sideband signals from the distant transmitter are received in the hybrid 13 and applied to a group filter 18 which, in this example, passes frequencies in the band between 100 and 116 KHz, and rejects other frequencies. This band of frequencies is applied to a group demodulator 19 with a 132 KHz signal from the oscillator 12 to convert the frequencies to a band between 16 and 32 KHz. This band of frequencies is applied to an automatic gain control (AGC) amplifier 20. The output level or gain of the AGC amplifier 20 is determined by a feedback signal supplied by a series circuit having a pilot frequency filter 22 and a pilot frequency amplifier and control circuit 21. The pilot frequency signal of 28 KHz is present in the band of frequencies received, and is supplied by a hybrid 23 (coupled to the output of the AGC amplifier 20) to the pilot frequency filter 22. Thus, a closed feedback loop automatic gain control circuit is provided. The pilot frequency filter 22 is a fairly narrow band filter, passing frequencies between 27.9 and 28.1 KHz for example. The band of frequencies between 16 and 32 KHz carrying information is supplied by the hybrid 23 to a unity gain amplifier 24, which is provided in a noise squelch circuit 25. The noise squelch circuit 25 includes a squelch control circuit 26 which operates from the pilot amplifier and control circuit 21 to reduce the gain of the amplifier 24 under excessive noise conditions. The frequencies from the amplifier 24 are applied to four channel demodulators as shown along with the demodulating frequencies from the oscillator 12 to provide audio or voice frequencies.

The system as described thus far is known in the art. Further explanation of such a system is given in U.S. Pat. No. 3,768,021. While FIG. 1 shows a terminal part of a system, it is to be understood that the system may also utilize a repeater. In a repeater, the receiver 11 would amplify received signals in either the 110–116 KHz band or the 16–32 KHz band and a transmitter would transmit these signals at the appropriate frequency. The transmitter 10 would have a receiver which would amplify received signals in an appropriate frequency band, and apply the amplified signals to the transmitter.

Whether the receiver 11 is utilized as a terminal as shown in FIG. 1 or is used as a repeater, there are conditions in which the automatic gain control amplifier 20 may not function properly. For example, when the receiver 11 is first turned on, or when the automatic gain control loop comprising the filter 22 and the pilot amplifier and control circuit 21 are switched into the circuit, the gain control function is momentarily left fully open. That is, the automatic gain control amplifier 20 provides full amplification or overdrive. If there is a large signal present at the input to the amplifier 20 at this time, the amplifier 20 provides a large output signal which suppresses the relatively small amplitude pilot signal. Or, it may substantially eliminate the pilot frequency signal. In either case, with the pilot frequency signal suppressed or missing, the feedback loop with the pilot amplifier and control circuit 21 can never start regulating properly, so that the automatic gain control amplifier 20 is placed in a full or high gain condition. This results in signals being distorted, and the pilot frequency signal being suppressed or lost.

Figure 2:
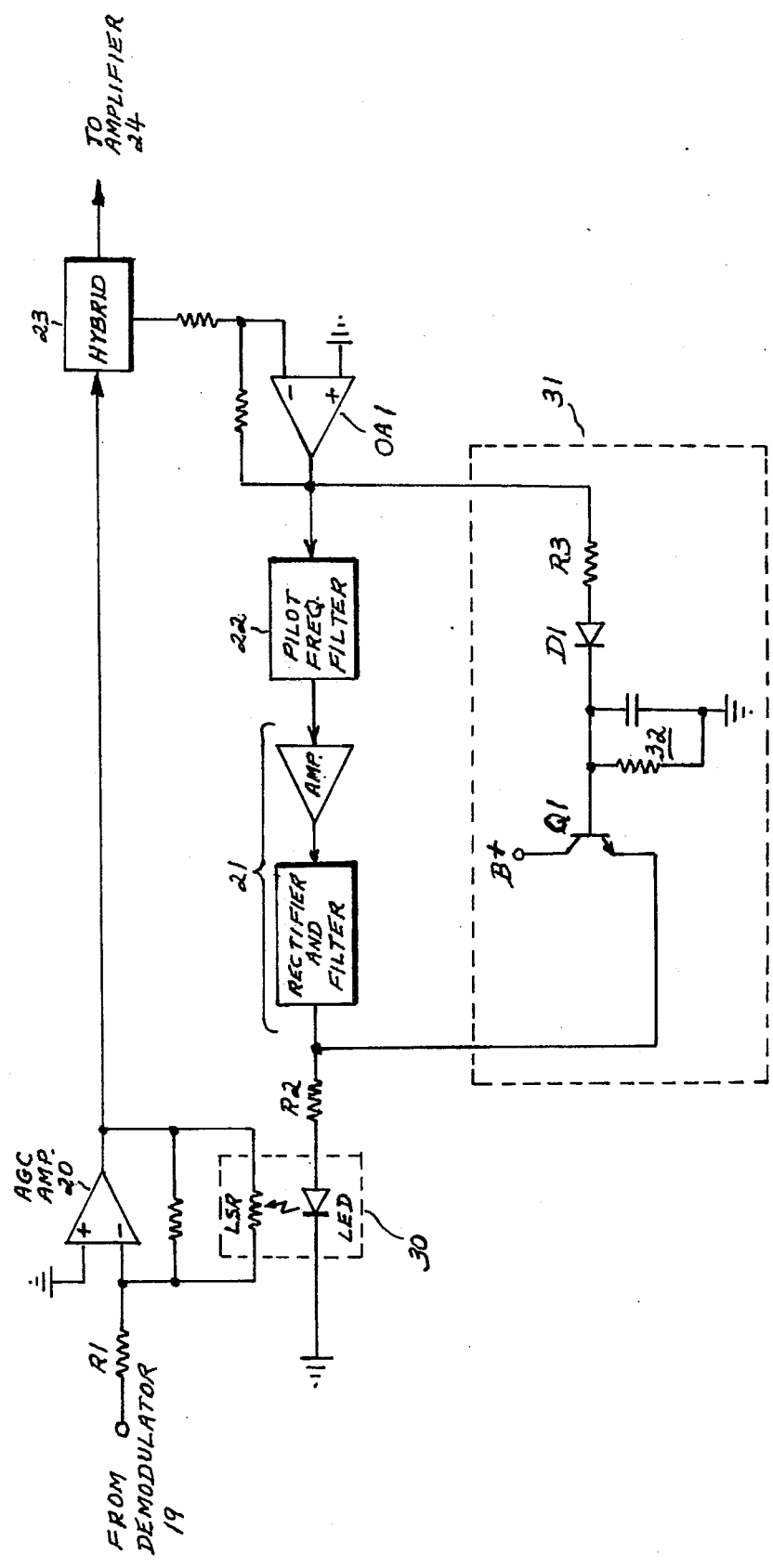
FIG. 2 shows an electrical diagram of an overdrive protection circuit in accordance with my invention which can be used with the power line carrier system of FIG. 1.

In order to eliminate this overdrive problem, I have provided an additional feedback or gain control loop 31 for the automatic gain control amplifier 20. My added gain control loop 31 is shown in the diagram of FIG. 2. In FIG. 2, parts corresponding to those shown in FIG. 1 have been given the same reference numeral. Signals from the demodulator 19 are applied through a resistor R1 to the negative input terminal of the automatic gain control amplifier 20. I have assumed that this amplifier 20 is an operational type. Signals from the amplifier 20 are applied to the hybrid 23, which supplies these signals to the amplifier 24. In addition, signals from the hybrid 23 are applied to and amplified by an operational amplifier OA1. These amplified signals are applied to the pilot frequency filter 22. Signals from the pilot frequency filter 22 are applied through the pilot frequency amplifier and control 21 (which includes a rectifier and filter) to the automatic gain control amplifier 20. I have shown the amplifier 20 being controlled by a photocoupler 30 having a light sensitive resistor LSR and a light emitting diode LED in operative relation. The light sensitive resistor LSR is connected between the output and the negative input terminal of the amplifier 20. As the resistance of the resistor LSR is lowered, more negative feedback is provided, and the gain of the amplifier 20 is reduced. As the resistance is raised, the gain of the amplifier 20 is increased. The magnitude of the resistance in the resistor LSR varies inversely with the amount of light reaching it. And the amount of light provided by the diode LED varies with the amount of current flow through the diode LED. Thus, with respect to the arrangement as described, as the magnitude of the pilot frequency signal increases, a larger magnitude of direct current is provided to the diode LED. This causes the gain of the amplifier 20 to be reduced. Conversely, as the magnitude of the pilot frequency signal decreases, a smaller magnitude of direct current is supplied to the diode LED, and this causes the gain of the amplifier 20 to increase. However, as pointed out above, there are times when the pilot frequency signal is lacking or so badly suppressed that it does not provide its proper function. Under these conditions, no direct current is supplied to the diode LED, so that the gain of the amplifier 20 is at a maximum. This tends to suppress the pilot frequency signal even more, with the result that the circuit is locked into a high gain condition, which I call overdrive. Such a condition causes faulty operation or distortion.

In accordance with my invention, I provide an overdrive protection circuit in the form of an added feedback or control loop circuit 31. This circuit 31 is connected between the output of the amplifier OA1 and the resistor R2 connected to the photocoupler circuit 30. This added loop comprises a resistor R3 and a rectifier diode D1. The rectified output is filtered by a filter circuit 32 comprising, for example, a capacitor and a resistor connected as shown. The filtered output is applied to the base electrode of an NPN type transistor Q1 whose collector is connected to a suitable source of direct current potential, and whose emitter is connected to the resistor R2. This added circuit 31 is a broadband circuit, and simply supplies a direct current signal at the emitter of the transistor Q1 which varies directly with the magnitude of the entire band of frequencies present in the system. Thus, my added gain control circuit 31 responds to all signals produced by the hybrid 23, so that proper gain control is provided to the photocoupler circuit 30. Thus, even if the pilot frequency signal is lacking, the magnitude of those signals provided by the hybrid 23 cause the transistor Q1 to produce a direct current signal which operates through the photocoupler circuit 30 to limit or control the gain of the AGC amplifier 20 as a function of the magnitude of those signals. Thus, the gain of the amplifier 20 will be controlled, and will not be locked into a high gain condition simply because the pilot frequency signal is lacking. However, once the pilot frequency signal is detected by the pilot frequency filter 22, the circuit 21 supplies direct current through the resistor R2 and the diode LED. This tends to back bias the transistor Q1 so that it supplies no current to the diode LED, and the gain control is provided only by the pilot frequency signal as it should be.

It will thus be seen that I have provided a new and improved power line carrier system having an added gain control loop or overdrive protection circuit to control the amplification or gain of the amplifier in the power line carrier system either as a function of the pilot frequency signal or as a function of all the signals. While I have shown only one embodiment of my invention, persons skilled in the art will appreciate the modifications that can be made. I have already mentioned that my gain control loop may be used in a repeated as well as in the terminal shown in FIG. 1. Also, it is possible to use other gain control circuits for the amplifier 20 in place of the photocoupler circuit 30. However, I prefer the photocoupler circuit 30 because of its simplicity and isolation. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved gain control circuit for use with an arrangement having:
   a. a first amplifier having an input for a band of signals including a pilot frequency signal, having a gain control terminal for controlling the gain of said first amplifier, and having an output;
   b. a gain control loop comprising an input terminal connected to said first amplifier output, a second amplifier having its input connected to said gain control loop input terminal, a filter for said pilot frequency signal connected to the output of said second amplifier, and means connecting said pilot filter output to said gain control terminal of said first amplifier for varying the gain of said first amplifier as an inverse function of the magnitude of said pilot frequency signal; and
   c. said improved gain control circuit comprising biasing means connected to said connecting means of said gain control loop for producing a bias signal in response to said pilot frequency signal exceeding a selected magnitude, and means connected between the output of said second amplifier and said connecting means of said gain control loop for varying the gain of said first amplifier as an inverse function of the magnitude of said band of signals, said biasing means of said improved gain control circuit rendering said improved gain control circuit inoperative in response to said bias signal.

2. An improved overdrive protection circuit for use in a power line carrier system having:
   a. an input circuit for receiving carrier signals including a pilot frequency signal;
   b. a controlled amplifier having an input connected to said input circuit, having an output, and having a first control circuit for varying the gain of said controlled amplifier;
   c. a second control circuit connected to said controlled amplifier output, said second control circuit comprising a pilot frequency signal filter tuned to pass a relatively narrow band of signals at said pilot frequency, said pilot signal frequency filter having an output connected to said first control circuit for controlling the gain of said controlled amplifier inversely as a function of the magnitude of said pilot frequency signals; and
   d. said improved overdrive protection circuit comprising biasing means connected to said output of said second control circuit for producing a bias signal in response to said pilot frequency signal exceeding a selected magnitude, a broadband control circuit having an input connected to said controlled amplifier output, and having an output connected to said first control circuit for controlling the gain of said controlled amplifier inversely as a function of the magnitude of the signals passed by said broadband control circuit, said biasing means rendering said overdrive protection circuit inoperative in response to said bias signal.

3. The improved overdrive protection circuit of claim 2 wherein said broadband control circuit comprises a rectifier, and a transistor having an input electrode connected to said rectifier and an output electrode connected to said biasing means.

4. The improved overdrive protection circuit of claim 2 wherein said second control circuit and said broadband control circuit each produce direct current signals for respectively controlling the gain of said controlled amplifier.

5. The improved overdrive protection circuit of claim 4 wherein said broadband control circuit comprises a rectifier, and a transistor having an input electrode connected to said rectifier and an output electrode connected to said biasing means.

* * * * *